United States Patent [19]
Gennesseaux

[11] Patent Number: 5,810,336
[45] Date of Patent: Sep. 22, 1998

[54] HYDRAULIC ANTI-VIBRATION DEVICES

[75] Inventor: André Gennesseaux, Chateaudun, France

[73] Assignee: Hutchinson, Paris, France

[21] Appl. No.: 790,712

[22] Filed: Jan. 29, 1997

[30] Foreign Application Priority Data

Jan. 30, 1996 [FR] France .................. 96 01075

[51] Int. Cl.⁶ ........................................ F16F 5/00
[52] U.S. Cl. ........................................ 267/140.14
[58] Field of Search ................ 267/140.13, 140.14, 267/219; 188/298; 248/363, 562, 636, 659

[56] References Cited

U.S. PATENT DOCUMENTS

| 4,793,599 | 12/1988 | Ishioka | 267/140.1 |
| 4,796,874 | 1/1989 | Hoying et al. | 267/140.1 |
| 4,805,884 | 2/1989 | Jordens et al. | 267/140.1 |
| 4,886,253 | 12/1989 | Lun | 267/140.1 |
| 5,116,029 | 5/1992 | Gennesseaux | 267/140.1 |
| 5,297,781 | 3/1994 | Gennesseaux | 267/140.14 |
| 5,333,846 | 8/1994 | Goto et al. | 267/140.14 |

FOREIGN PATENT DOCUMENTS

| 0 243 714 | 11/1987 | European Pat. Off. |
| 0 440 536 A1 | 8/1991 | European Pat. Off. |
| 0 536 761 A1 | 4/1993 | European Pat. Off. |
| 0 561 703 A1 | 9/1993 | European Pat. Off. |
| 0621 418 A2 | 10/1994 | European Pat. Off. |
| 7233852 | 9/1995 | Japan. |

OTHER PUBLICATIONS

French Search Report dated 17 Oct. 1996, French Appl. No. FR 96 01075.

Primary Examiner—Robert J. Oberleitner
Assistant Examiner—Charles R. Ducker, Jr.
Attorney, Agent, or Firm—Marshall, O'Toole, Gerstein, Murray & Borun

[57] ABSTRACT

This is a hydraulic anti-vibration mount intended to be interposed between a vehicle body and an engine and in particular comprising an armature which can be secured to the body, a head which can be secured to the engine, a thick frustoconical wall linking a circular bearing surface of the armature to the head and defining with the latter a working chamber, and a diaphragm defining with the armature a compensation chamber which communicates with the chamber via a restricted passage. An active attenuation device is also provided, the device comprising a piston immersed in the working chamber, a member for exciting this piston and an electronic circuit for controlling this excitation member. The armature forms on the one hand a double pan constituting the ends, arranged side by side, of the two chambers and on the other hand a housing containing side by side the excitation member and its electronic control circuit.

8 Claims, 3 Drawing Sheets

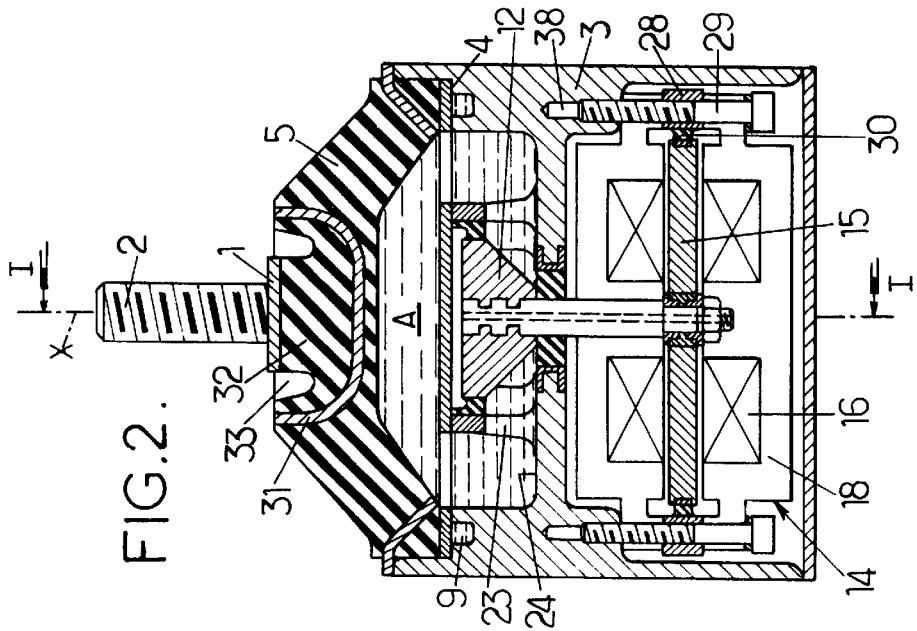
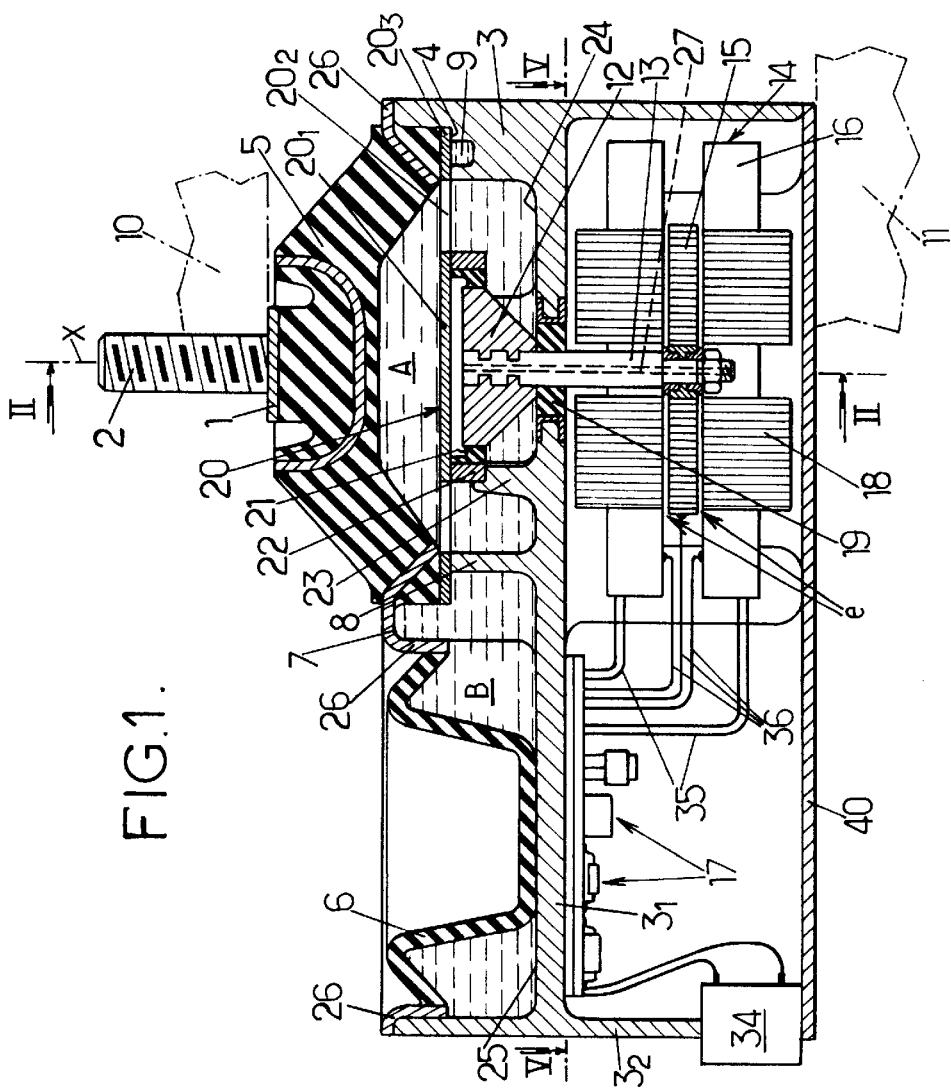

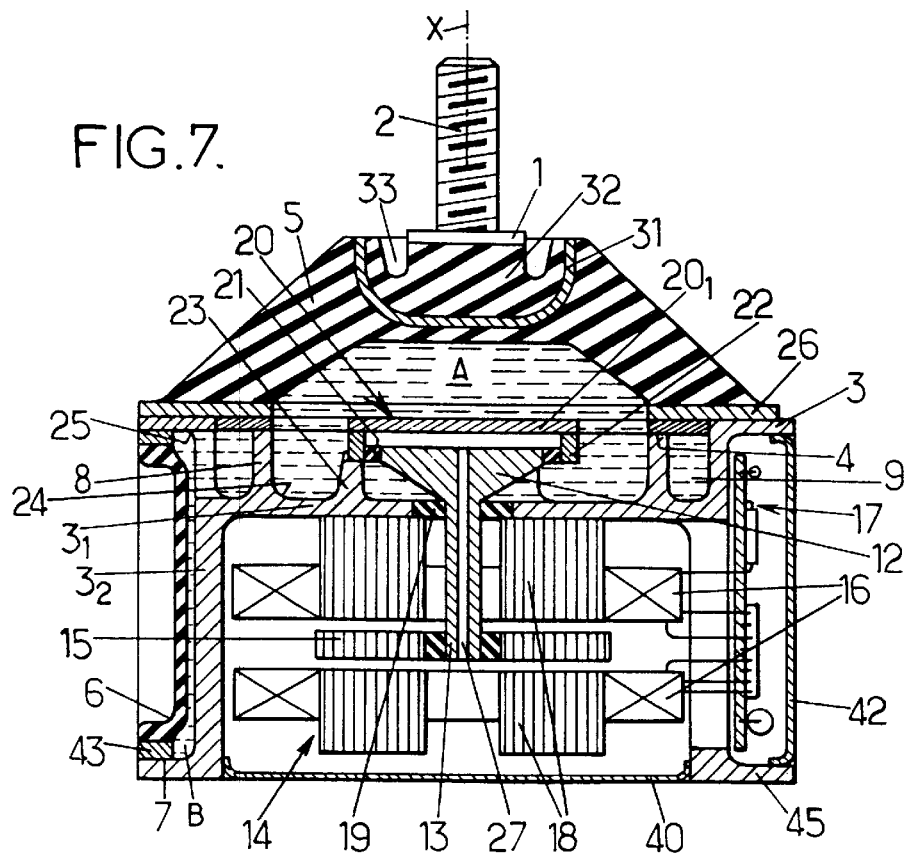
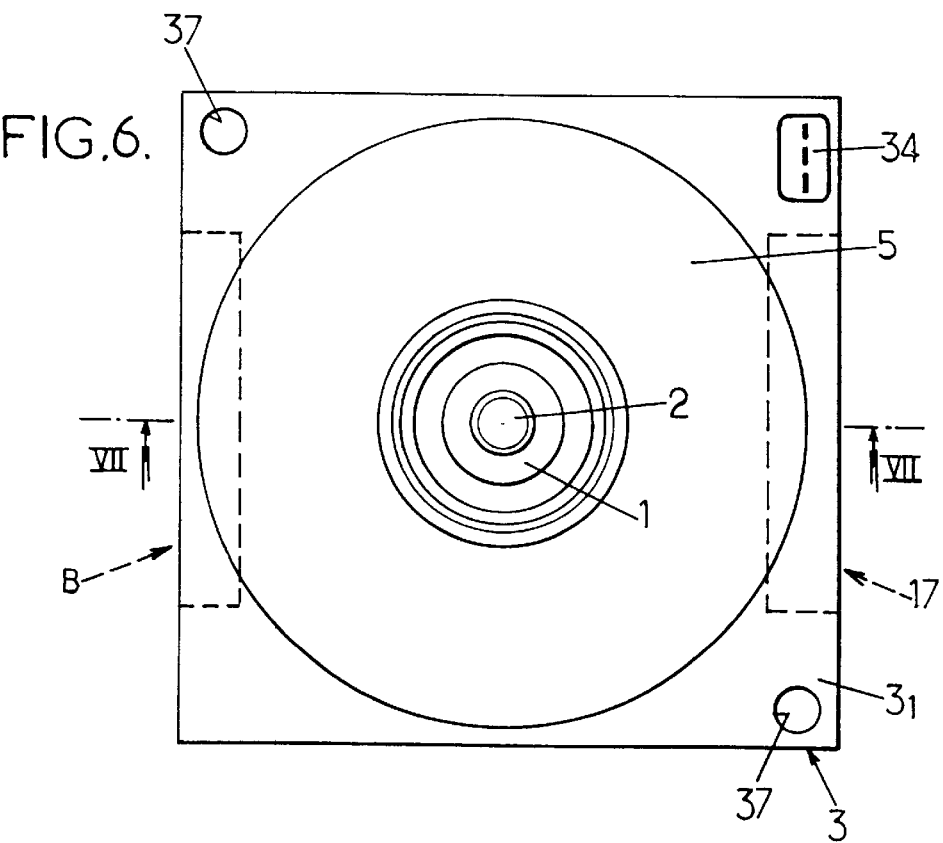

HYDRAULIC ANTI-VIBRATION DEVICES

FIELD OF THE INVENTION

The invention relates to hydraulic anti-vibration devices intended to be interposed, for the purposes of damping and of linking, or even of supporting, between two rigid elements forming part respectively of the body, or chassis, of a vehicle and of the engine of this vehicle.

BACKGROUND OF THE INVENTION

It relates more specifically, among such devices, to those which comprise:

- a rigid armature which can be secured to the rigid element of the body and includes an annular bearing surface,
- a rigid head which can be secured to the other rigid element,
- an annular elastomer wall which is flared downward, preferably frustoconical, offering good resistance to axial compression and linking the annular bearing surface to the head in a sealed manner,
- a sealed flexible diaphragm borne by the armature and defining with it, with the wall and with the head, a sealed enclosed space,
- a rigid and sealed partition borne by the armature and dividing the enclosed space into a working chamber on the same side as the wall and a compensation chamber on the same side as the diaphragm, these two chambers each having an end secured to the rigid armature,
- a restricted passage allowing the two chambers always to communicate with each other,
- a mass of liquid filling the two chambers and the restricted passage,
- a rigid piston partly delimiting the working chamber and mounted on the armature in such a way that it can move with a limited amplitude of travel with respect to this armature,
- an electric excitation member mounted on said armature in order to displace said piston,
- and an electronic circuit which can be connected to a source of electric current and is capable of controlling the excitation member in such a way as to apply to the piston alternating forces which tend to attenuate the vibrations of this piston.

As is known, with such a device:

- the oscillations of relatively large amplitude (namely greater than 0.5 mm) and of relatively low frequency (namely of the order of 5 to 15 Hz), like those due to the "jerkiness" caused on the vehicle by bumps in the road have the effect of discharging the liquid from one of the two chambers into the other and vice versa through the restricted passage, with the mass of liquid thus discharged going into resonance when the frequency of said oscillations reaches a predetermined value which depends on the ratio between the axial length and the cross section of the restricted passage, this resonance giving excellent damping of the oscillations in question;
- the vibrations of relatively small amplitude (smaller than 0.5 mm) and of relatively high frequency (generally between 20 and 200 Hz), like those due to the running of the engine result in "natural" vibrations of the piston which are liable to attenuate or filter the transmission of the vibrations involved,
- the application of electric attenuation forces to the piston is effected in such a way that these forces cause this piston to experience artificial "counter-vibrations" which are phase shifted with respect to its natural vibrations and tend to cancel out the latter, permanently eliminating any vibration at the armature; this effect of attenuating or of filtering vibrations is sometimes known by the term "active attenuation".

Such "active" devices have been described, for example, in document EP-0 561 703.

These devices make it possible to achieve, in the case of the body of the vehicle, a degree of isolation which cannot be obtained with "passive" devices, that is to say with devices which do not have active attenuation means.

OBJECT AND BRIEF SUMMARY OF THE INVENTION

The object of the invention is to propose, in the case of active devices of the sort in question, constructions which meet the various practical requirements even better than hitherto, especially:

- by making it possible for the active devices in question to be interchanged with the conventional passive devices on account of the reduced height of the former,
- by improving the operation of these active devices on account of the shortening of the connections and of the better protection of the control circuits from overheating,
- and by leading to a reduced cost price.

To this end, the active anti-vibration devices of the sort in question according to the invention are essentially ones wherein the rigid armature forms:

- on the one hand, first and second pans arranged side by side and constituting the ends of the working chamber and of the compensation chamber,
- and, on the other hand, a housing containing side by side the excitation member and its electronic control circuit, the housing being separated from the working chamber and the compensation chamber by the rigid armature.

In preferred embodiments, recourse is further had to one and/or another of the following provisions:

- the rigid armature consists of a thick plate having a first face which has the first and second pans hollowed from it and a second face which is bordered by a peripheral partition and which with this partition delimits the housing,
- the rigid armature includes a thick plate having, on the one hand, a first face from which the first pan corresponding to the working chamber is hollowed and, on the other hand, a second face which is bordered by a peripheral partition and which with this partition delimits this housing, the second pan being formed in the peripheral partition and pointing outward, the housing being separated into a first compartment which contains the excitation member, and a second compartment which communicates with the first compartment and which contains the electronic control circuit, the first compartment being substantially surrounded by the peripheral partition, the second compartment being delimited by a third pan formed in the peripheral partition and pointing outward,
- the rigid armature consists of cast light alloy and is designed in such a way that it can be bolted directly to the body of the vehicle,
- the pans have thick edges, the restricted passage being delimited by a channel which is hollowed from the thick edges of the pans and which is closed by a washer which constitutes the periphery of a perforated plate, the edges of the pans are covered with a pressed perforated metal sheet to which the edges of the thick wall and of the diaphragm are bonded, the anti-vibration device comprises, immersed in the working chamber, a capsule forming an air pocket, preferably vented to atmosphere, delimited by:

a solid central portion belonging to a perforated plate, the piston, which is then arranged between this solid central portion and the excitation member, and a leaktight and flexible annular seal linking the periphery of the piston to said solid central portion.

Apart from these main provisions, the invention comprises certain other provisions which are preferably used at the same time and which will be dealt with more fully hereafter.

BRIEF DESCRIPTION OF THE DRAWINGS

In what follows, two preferred embodiments of the invention will be described with reference to the drawings appended hereto in a way which is of course nonlimiting.

FIGS. 1 and 2 of these drawings show respectively in vertical section on I—I, FIG. 2 and in vertical section on II—II, FIG. 1, a hydraulic anti-vibration mount produced according to a first embodiment of the invention.

FIG. 6 is a view from above of a hydraulic anti-vibration mount according to a second embodiment of the invention.

FIG. 7 is a view in section on VII—VII of the anti-vibration mount of FIG. 6.

MORE DETAILED DESCRIPTION

Figure 3:
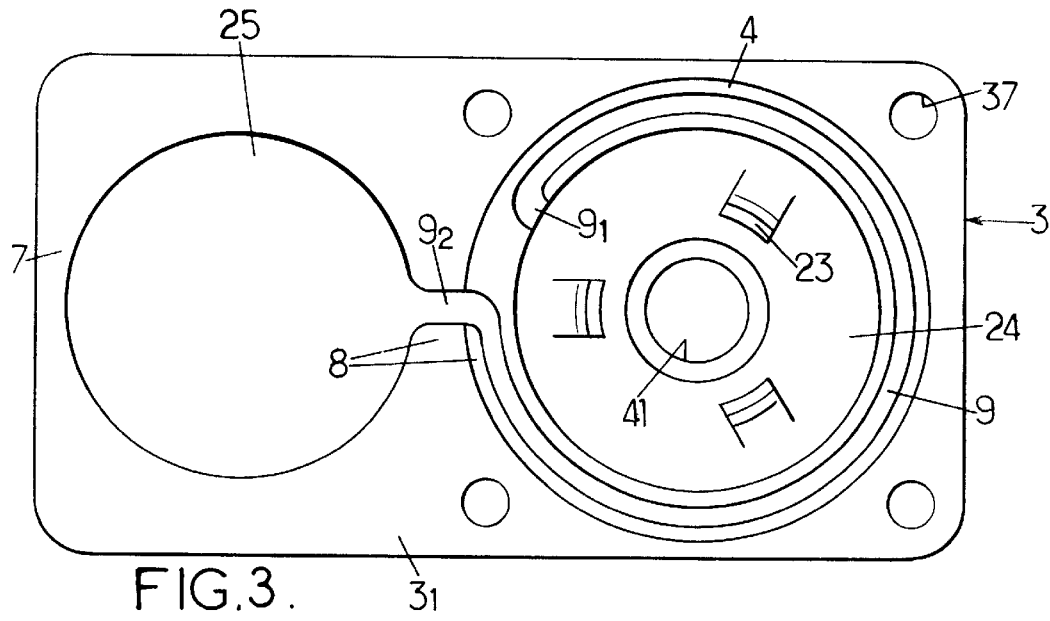
FIGS. 3 and 4 are respectively a view from above and a view from below of the bare housing of which said device consists.

In the various figures, the same references denote identical or similar elements.

The orientation which has been adopted for the mount in the drawings will be kept for the description hereafter which of course is nonlimiting in nature: in other words, this mount could just as easily, without departing from the scope of the present invention, be considered with any desirable orientation other than the one illustrated, for example with an orientation which is inclined by 45° or by 90°, or even inverted with respect to this one, the terms "top, bottom, . . . " then having to be amended to suit.

That being so, the mount represented in FIGS. 1 to 5 comprises:

a rigid head 1 consisting of a central pad extended upward by a fixing stud 2 of axis X standing ready, a rigid armature 3 which will be returned to later, the armature particularly comprising an annular bearing surface 4 of axis X, a thick frustoconical wall 5 made of rubber of axis X flared downward and having good resistance to axial compression so that it can act as a "mount", said wall linking the head 1 to the bearing surface 4 in a sealed manner, a sealed diaphragm or bellows 6 linked in a sealed manner to a second rigid annular bearing surface 7 included by the armature 3, the bellows constituting with said armature and with the wall 5 an enclosed space, a rigid partition 8 forming part of the armature and dividing said enclosed space into two chambers, namely a working chamber A on the same side as the wall 5 and a compensation chamber B on the same side as the bellows 6, a restricted passage 9 linking the two chambers A and B together, and a mass of liquid filling the two chambers and the restricted passage.

The rigid head 1 is intended to support a vehicle internal combustion engine 10 while the rigid armature 3 is intended to be mounted on the chassis 11 of this vehicle.

As is known, the oscillations of relatively low frequency and large amplitude which are applied between the armature 3 and the head 1 result in the alternate discharge at the same frequency of liquid from one of the two compartments A and B into the other and vice versa through the passage 9 and the oscillating column of liquid contained in this passage is the root cause of a resonance phenomenon when said frequency reaches a predetermined value which depends on the dimensions of said passage, the effect of this phenomenon being to damp out the transmission of the original oscillations between the head and the armature.

In a way which is also known per se, the mount in question further comprises a piston 12, one face of which dips into the working chamber A, the piston being secured to the moving member 13 of an electric actuator or excitation member 14.

This excitation member is arranged in such a way that it exerts on the piston 12 an "active attenuation" in the sense defined hereinabove, and to this end comprises:

a ferromagnetic, preferably laminated plate 15, secured to the moving member 13, which here consists of a rod of axis X, at least one electric coil 16 linked to an electronic excitation circuit 17 and mounted in a yoke 18 secured to the armature 3 in such a way as to create a magnetic circuit which is completed through the plate 15 and thin air gaps e, and a sealing ring 19 interposed between the rod 13 and an appropriate orifice 41 in the armature to allow the axial displacements of said rod while still isolating the ferromagnetic element 15 from the liquid.

The piston 12 is mounted at the upper end of the rod 13 and, in accordance with what was described and illustrated in the second of the aforementioned two EP documents, that face of this piston which is in contact with the liquid in the working chamber A is in this case its lower face.

As explained in said document, this assembly allows the inertial force of the piston to be added to the force exerted by the hydraulic pressure on this piston instead of being deducted therefrom, which does away with the possibility of obtaining zero effectiveness of the active attenuation for one of the values of the frequency of oscillations imposed on the piston.

To this end, there is formed within the working chamber A a capsule forming an air pocket delimited on the underside by the piston 12 and on the top side by a rigid transverse wall $20_1$ secured to the armature 3, the periphery of the piston being connected to this wall by a flexible and leaktight ring 21.

This ring 21 could be connected directly to said wall $20_1$, but to simplify and reinforce the assembly, it is preferable to connect it to a rigid ring 22 itself mounted on three legs 23 forming part of the armature 3 and distributed at 120° angles apart about the axis X: the angular spaces between these three legs allow the liquid to flow between the underside of the piston 12 and the rest of the chamber A.

The ring 22 is itself pressed contiguously, in the axial direction, against the underside of the wall $20_1$, which constitutes the solid central portion of a plate 20.

As far as the armature 3 is concerned, this is made in the form of a housing having the overall appearance of a right-angled parallelepiped which in its upper portion comprises a double pan forming the ends, arranged side by side, of the two chambers, namely the working chamber A and the compensation chamber B, and which in its lower portion contains, side by side, the actuator 14 and the electronic circuit 17 for controlling it.

More specifically, said housing or armature 3 is formed by a relatively thick horizontal plate $3_1$ of rectangular shape, of which the upper face has two neighboring pans 24 and 25 hollowed from it, these pans respectively defining the ends of the two chambers A and B, and of which the lower face, bordered by a vertical upstand $3_2$ which is relatively thin, constitutes with this upstand the housing for accommodating the electromechanical portion of the mount.

The edge of the pan 24 defines the above annular bearing surface 4 and it is from this bearing surface 4 that a channel defining most of the restricted passage 9 is hollowed.

This channel is closed on the top by a washer $20_3$ constituting the periphery of the plate 20.

In the case of the drawing, the channel defining the restricted passage 9 extends in an arc of a circle of the order of 320° about the axis X and ends in two radial connections $9_1$ and $9_2$, the first of which opens into the pan 24 and the second of which opens into the pan 25 after having passed through the partition 8.

Perforations $20_2$ cut from the plate between its solid central wall $20_1$ and the peripheral washer $20_3$ ensure that the chamber A is continuous on each side of said plate.

The edge of the pan 25 for its part defines the annular bearing surface 7.

This bearing surface 7 is advantageously covered, as are the other surfaces of the armature 3 which are flush at the same level as it, with a perforated metal sheet 26 which is pressed to match these surfaces.

The elastomer assembly consisting of the wall 5 and the bellows 6 can be molded and vulcanized over this sheet 26 at the same time.

Said sheet 26 is fixed to the armature 3 in any desirable way, for example by crimping or screwing.

It should be noted that locating the two chambers A and B side by side offers the following two advantages:

the horizontal spreading of the mount, the overall height of which is therefore greatly reduced, which allows both the working chamber A and the actuator 14 to be superposed in a total vertical space which does not exceed that of a passive mount of the same type, the possibility of manufacturing the elastomer components of the two chambers A and B simultaneously and easily, something which would not have been possible were the compensation chamber B to have been located below the working chamber A, or even with a construction in which the chamber B surrounded the actuator.

The armature 3 advantageously is formed by casting a material having good heat conductivity, especially a light alloy.

Figure 4:
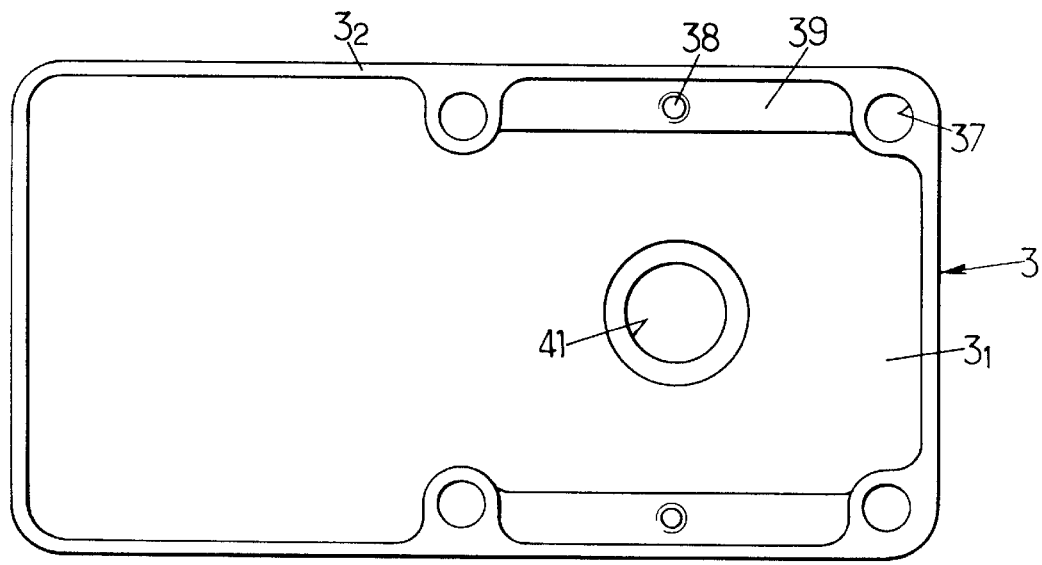
Figure 5:
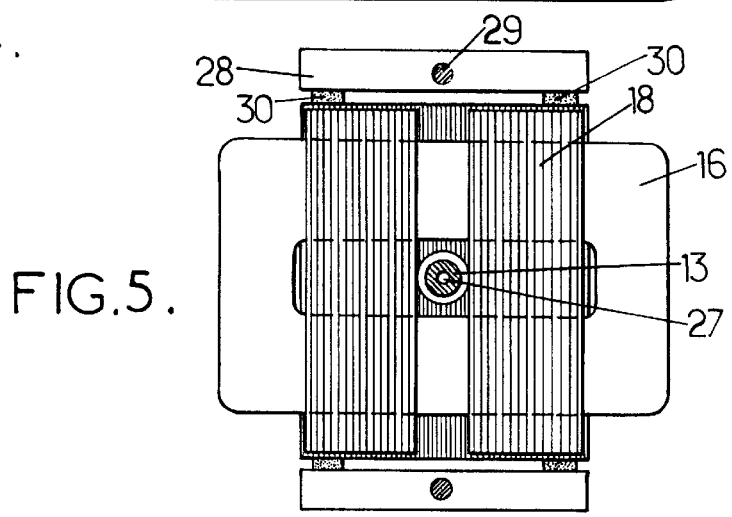
FIG. 5 is a partial cross section of the device in question on V—V, FIG. 1.

As even more clearly visible in the drawings, the air pocket formed between the piston 12 and the wall $20_1$ is vented to atmosphere through a duct 27 hollowed axially from the rod 13, the plate 15 made of ferromagnetic material in which the counter-vibrations are generated is supported and guided by two rectangular spacers 28 through which there pass screws 29 used to mount the packets of laminations of which the yoke 18 is made on the armature 3, said spacers being clamped against these packets and linked to said plate by rubber pads 30, the link between the upper portion of the frustoconical wall 5 and the head 1 is by means of a dished metal element 31 and a rubber pad 32 contained inside this dished element and from which pad a circular groove 33 is hollowed: this groove constitutes a radial cut which makes the mount very flexible in the radial directions, which filters out vibrations liable to be transmitted radially from the head 1 to the armature 3, the electronic circuit 17 is linked to a connector 34 capable of receiving an external power supply and comprises not only wires 35 capable of powering the coils 16, but also wires 36 capable of picking up information given by a sensor (not represented) which senses the actual instantaneous displacements of the plate 15, the armature 3 has hollowed from it bores 37 which allow the passage of bolts for fixing this armature to an appropriate rigid bearing surface of the body 11 of the vehicle, visible in FIG. 4 are threaded bores 38 for accommodating the screws 29, these bores being hollowed from shoulders 39 which run along and reinforce the upstands $3_2$, a base 40 is attached under the lower portion of the armature 3 forming the housing in order to close its underside.

The upshot of this is that, irrespective of the embodiment adopted, the end result is a hydraulic anti-vibration mount of the active type the construction and operation of which are sufficiently obvious from the foregoing.

By comparison with previously known mounts, this one presents a certain number of advantages, particularly the following ones:

as the compensation chamber B is arranged transversely beside the working chamber A instead of being arranged below this chamber, it is possible to give the overall vertical dimension of the mount a value which is identical to, and no greater than, that of comparable mounts of the passive type, which allows said prior-art passive mounts to be replaced purely and simply by the novel active mounts proposed here without it being in any way necessary to alter the general arrangement of the body and/or that of the engine of the vehicle, as the electronic circuit 17 is contained within the same housing as the actuator 14 itself, it is unnecessary to provide special and relatively long connections between this circuit and this actuator, which connections require the use of special connectors, shielding and wiring liable to generate parasitic effects, and the imperfect functioning of which risks disturbing the overall operation, the possibility of mounting the housing/armature 3 directly on the body 11 of the vehicle, associated with the construction of this component in a material which is a good thermal conductor, allows any heat present, due especially to the power dissipated by the electronics or to the proximity of the engine during operation, to drain away easily to the vehicle body, which avoids undesirable heating-up of the electronic circuit and extends its life, the incorporation of the electronic circuit and of the actuator into one and the same housing makes it possible to avoid resorting to two independent housings, as well as to the double operation of mounting two such housings on the body of the vehicle, which leads to a more economical construction.

Furthermore, the hydraulic anti-vibration mount represented in FIGS. 6 and 7 is similar to the mount already described earlier with reference to FIGS. 1 to 5, which means that this mount will not be described again in detail here.

It need merely be noted that the mount in FIGS. 6 and 7 can essentially be distinguished from the one in FIGS. 1 to 5 by the following points:

the two juxtaposed bowls 24, 25 of the rigid armature 3 are not both formed in the upper face of the horizontal plate $3_1$: only the pan 24 delimiting the end of the working chamber A is formed in the upper face of this plate $3_1$, the pan 25 which delimits the end of the compensation chamber B for its part being formed on the outer face of the vertical upstand $3_2$ of the rigid armature, along one of the sides of the square or rectangular horizontal plate $3_1$;

the electromechanical parts 14, 17 of the device are still separated from the hydraulic parts A, B, 9 by the rigid armature 3, but only the electric actuator 14 lies inside the upstand $3_2$ of the armature 3, the electronic excitation circuit 17 for its part lying outside this upstand, in a pan or vertical recess 45 arranged along one of the sides of the horizontal plate $3_1$, this side being situated, for example, on the opposite side to the compensation chamber B, and the electronic circuit 17 preferably being protected by a rigid cover 42 which closes the pan 45 on the outside;

the metal sheet 26 is in the form of a flat washer which is bonded only to the base of the frustoconical elastomer wall 5, the periphery of the elastomer diaphragm 6 for its part being bonded to a metal ring 43 fixed inside the pan 25.

The anti-vibration mount which has just been described with reference to FIGS. 6 and 7 has the following advantages:

it has a relatively small horizontal size, and one which in any case is comparable with the horizontal size of anti-vibration mounts which have no electromechanical actuating means, like in the embodiment of FIGS. 1 to 5, the electronic circuit 17 is close to the actuator 14, which avoids the use of special and long connections between this circuit and this actuator, the armature 3 can be mounted directly on the body of the vehicle, excess heat easily draining away to this body, and the incorporation of the electronic circuit and of the actuator into one and the same housing secured to the hydraulic parts of the device allows easy mounting on the body of the vehicle and a more economical construction.

As goes without saying, and as is in any case already obvious from the foregoing, the invention is not in any way limited to those of its methods of application and embodiments which have been more specifically envisaged; on the contrary, it encompasses all the alternative forms thereof.

I claim:

1. A hydraulic anti-vibration device intended to be interposed between two rigid elements forming part respectively of the body of a vehicle and of the engine of this vehicle, comprising:

a rigid armature which can be secured to the rigid element of the body and includes an annular bearing surface, a rigid head which can be secured to the other rigid element, an annular elastomer wall which is flared downward, preferably frustoconical, offering good resistance to axial compression and linking the annular bearing surface to the head in a sealed manner, a sealed flexible diaphragm borne by the armature and defining with it, with the wall and with the head, a sealed enclosed space, a rigid and sealed partition borne by the armature and dividing the enclosed space into a working chamber on the same side as the wall and a compensation chamber on the same side as the diaphragm, these two chambers each having an end secured to the rigid armature, a restricted passage allowing the two chambers always to communicate with each other, a mass of liquid filling the two chambers and the restricted passage, a rigid piston partly delimiting the working chamber and mounted on the armature in such a way that it can move with a limited amplitude of travel with respect to this armature, an electric excitation member mounted on said armature in order to displace said piston, and an electronic circuit which can be connected to a source of electric current and is capable of controlling the excitation member in such a way as to apply to the piston alternating forces which tend to attenuate the vibrations of this piston, wherein the rigid armature forms:

first and second pans arranged side by side and constituting the ends of the working chamber and of the compensation chamber, and, a housing containing side by side the excitation member and its electronic control circuit, the housing being separated from the working chamber and the compensation chamber by the rigid armature.

2. The anti-vibration device as claimed in claim 1, in which the rigid armature consists of a thick plate having a first face which has the first and second pans hollowed from it and a second face which is bordered by a peripheral partition and which with this partition delimits the housing.

3. The anti-vibration device as claimed in claim 1, in which the rigid armature includes a thick plate having a first face from which the first pan corresponding to the working chamber is hollowed and a second face which is bordered by a peripheral partition and which with this partition delimits this housing, the second pan being formed in the peripheral partition and pointing outward, the housing being separated into a first compartment which contains the excitation member and a second compartment which communicates with the first compartment and which contains the electronic control circuit, the first compartment being substantially surrounded by the peripheral partition, the second compartment being delimited by a third pan formed in the peripheral partition and pointing outward.

4. The anti-vibration device as claimed in claim 1, in which the rigid armature consists of a cast light alloy and is designed in such a way that it can be bolted directly to the body of the vehicle.

5. The anti-vibration device as claimed in claim 1, in which the pans have thick edges, the restricted passage being delimited by a channel which is hollowed from the thick edges of the pans and which is closed by a washer which constitutes the periphery of a perforated plate.

6. The anti-vibration device as claimed in claim 1, in which the edges of the pans are covered with a pressed perforated metal sheet to which the edges of the thick wall and of the diaphragm are bonded.

7. The anti-vibration device as claimed in claim 1, comprising, immersed in the working chamber, a capsule forming an air pocket delimited by:

a solid central portion belonging to a perforated plate, the piston, which is then arranged between this solid central portion and the excitation member, and a leaktight and flexible annular seal linking the periphery of the piston to said solid central portion.

8. The anti-vibration device as claimed in claim 7, in which the capsule is vented to atmosphere.

* * * * *